Figure 1:
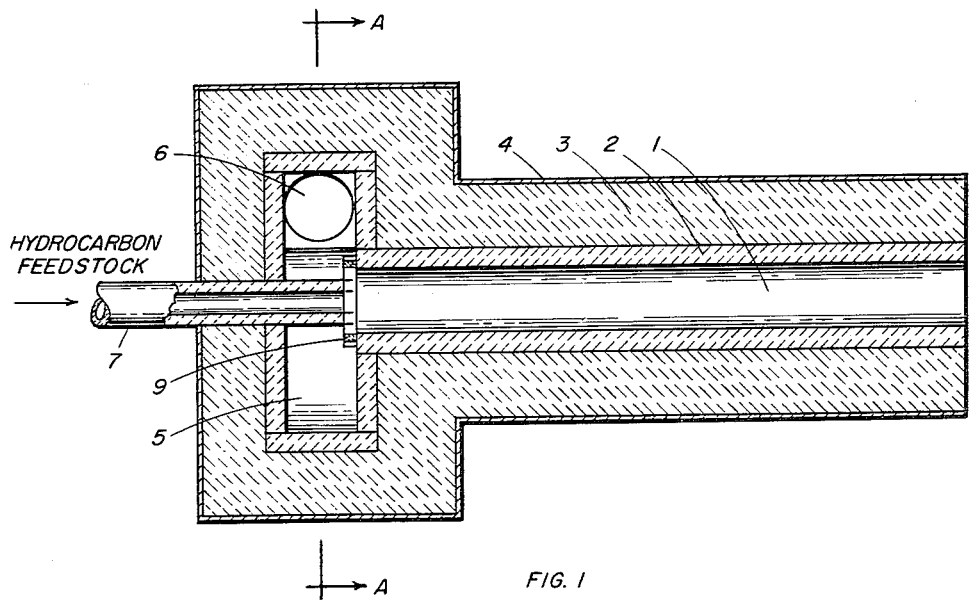

INVENTOR.
TRAVIS S. WHITSEL, JR.
BY

ATTORNEY

United States Patent Office 3,051,556
Patented Aug. 28, 1962

3,051,556
CARBON BLACK APPARATUS
Travis S. Whitsel, Jr., Borger, Tex., assignor to United Carbon Company, Inc. (Maryland), Houston, Tex., a corporation of Maryland
Filed Apr. 11, 1960, Ser. No. 21,309
4 Claims. (Cl. 23—259.5)

This invention relates to carbon black. More particularly, it relates to the preparation of carbon black. Still more particularly, it relates to a method and apparatus for producing carbon black by thermal decomposition of a hydrocarbon.

The preparation of furnace type carbon blacks by thermal decomposition of a gaseous or liquid hydrocarbon is well known. In general, this method of preparation comprises decomposing a hydrocarbon by heat generated from the burning of a portion of the hydrocarbon and/or by the substantially complete combustion of a second, and generally different, hydrocarbon. The hydrocarbon feedstock employed, the method of injecting the reactants into the reactor, reaction temperature, reaction time, peripheral velocity and turbulence of the reaction mass in the reaction chamber, ratio of refractory surface to reaction chamber volume, among other things, are all variables which determine the grade of carbon black as well as the quality of any particular grade. There has been and continues to be considerable study of these variables, with the result that over the years certain modifications or improvements of the basic furnace process for preparing carbon black have been proposed.

One such modification provides for the tangential injection of a combustible hydrocarbon mixture into a combustion zone of a substantially tubular reactor having an elongated reaction zone coaxial and in open end communication with but substantially smaller in diameter than the combustion zone, whereby a rotational motion is given to the mixture. As a result, a violently turbulent mass is produced as the combustible mixture and its products of combustion are constricted on their entry into the reaction zone. Into this turbulent mass is introduced a hydrocarbon feedstock, usually as an axial flow passing through the combustion zone, which is rapidly decomposed to carbon black.

While the above described modification has proved effective in the preparation of furnace blacks, nevertheless, it is subject to certain limitations. For instance, the flow of combustible mixture and its products of combustion should preferably be at an optimum velocity and spiralling configuration when making initial contact with the feedstock within the reaction zone. Aside from the tangential injection of the combustible mixture, however, no positive direction is given to the flow thereof in the described modification to insure the formation and maintenance of such an optimum spiralling configuration. Nor is an optimum velocity necessarily attained in the reaction zone since friction losses are suffered in the combustion zone as the mixture passes over the large surface area thereof. A further limitation resides in the injection of the feedstock as a spray across the combustion zone subjecting it to possible oxidation prior to its entry into the reaction zone. This mode of injection, moreover, presents the possibility of inaccurate direction of the feedstock spray with resultant coking of the entrance surfaces of the reaction zone.

Other modifications or improvements of the furnace process are confronted with similar limitations. Accordingly, in spite of the apparent commercial success of such modifications, there has continued to remain a demand for a still further improved process for producing furnace blacks having the advantages of such modifications but which is not subject to the disadvantages thereof.

It is a principal object of this invention, therefore, to provide such a process. It is particularly an object of this invention to provide a process in which the flow of combustible mixture and its products of combustion is so controlled and directed as to provide an optimum spiralling configuration and velocity at the most profitable point in the process. A further object of this invention is to provide a process in which improved mixing is obtained through increased turbulence of combustion products. A still further object is to provide a process applicable to the preparation of various grades of furnace black in high yield and of consistent quality. An additional object of this invention is to provide an apparatus specifically adapted for conducting the process of this application.

These objects have been met in a relatively simple yet surprisingly effective manner. In general, the process of this invention comprises introducing a hydrocarbon feedstock into one end of an elongated, tubular reaction zone maintained at a carbon black forming temperature. Similar to the above described modification, a material capable of creating and maintaining this temperature is tangentially introduced into a tubular combustion zone coaxial and in open end communication with the reaction zone. According to the process of this invention, however, the material is caused to follow a path within the combustion zone of ever decreasing cross sectional area prior to being caused to abruptly change direction and enter the same end of the reaction zone as the feedstock. An intimate mixture of the material and the feedstock is thus obtained and the feedstock brought to its cracking temperature. The reaction is terminated at a predetermined time, and the resultant carbon black-bearing gases subjected to further treatment to separate and collect carbon black.

Figure 2:
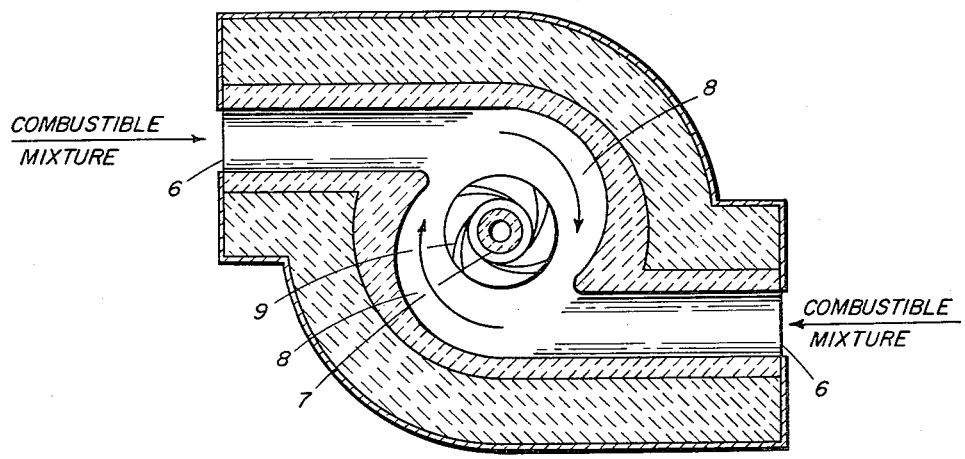

Although the process of this invention may be conducted in any reactor of a configuration suitable to carry out the steps thereof, nevertheless, it can be more easily described and its advantages best appreciated by reference to a specific configuration. For this purpose, therefore, the process of this invention will be further discussed in conjunction with the accompanying drawing in which:

FIGURE 1 is a sectional plan view of a reactor in accordance with this invention; and FIGURE 2 is an end view thereof taken along the line A—A in FIG. 1.

It should be understood, however, that the configuration shown in the drawing is intended to be by way of illustration only and not by way of limitation.

In describing the process and apparatus of this invention, the terms "combustible mixture" and "combustion mass" will be employed. By the former is meant a mixture of a hydrocarbon and a combustion supporting oxygen-bearing gas. By the latter is meant a mass comprising the products resulting from the combustion of the combustible mixture which mass may or may not include unreacted combustible mixture or a combustion-supporting oxygen-bearing gas substantially free of unreacted hydrocarbon.

Referring now to FIGURE 1 of the drawing, there is illustrated therein a reactor in which numeral 1 denotes an elongated reaction zone or chamber of a generally tubular configuration surrounded by a high temperature refractory liner 2. Backing up liner 2 is a castable refractory insulation 3 which in turn is provided with an outer steel shell or casing 4. The refractories are conveniently constructed of high temperature resistant material well known in the art. Both ends of reaction zone 1 are open, one of which communicates with a carbon black recovery system forming no part of this invention. The other and opposite end of the reaction zone communicates with combustion zone or chamber 5 of a larger diameter but of considerably shorter length than reaction zone 1, said combustion zone being enclosed by similar refractory material. Situated tangentially to the inner surface of the combustion zone are a plurality of inlets 6 for introducing combustible mixture either as such or as its components. Alternatively, these inlets may be used to introduce a combustion supporting oxygen-bearing gas alone, such gas being referred to herein as "process air." While FIGURE 2 of the drawing shows two of such inlets, it should be understood that any number of such tangentially disposed inlets may be employed. Protruding through the end of the reactor and extending across the combustion zone to terminate at the entrance of the reaction zone 1 is a feedstock conduit 7 of refractory material. Associated with the feedstock conduit are additional means, not shown, for introducing a combustion-supporting oxygen-bearing gas. Such gas will be referred to herein as "axial air."

As more fully illustrated in FIGURE 2, combustion zone 5, unlike the practice heretofore, is non-circular in configuration. Instead, those parts of the zone which, in effect, constitute extensions of inlets 6 have in each case, an outer wall of decreasing radius, so as to form with feedstock conduit 7 what essentially constitutes a plurality of passageways 8 of decreasing radial cross sectional area. The rate at which the radius of the outer wall of the combustion zone decreases with respect to each inlet 6 may vary considerably. Preferably, however, the rate for all inlets is uniform, or nearly so, whereby a plurality of substantially symmetrical pasageways are created, the outer surfaces of which, if extended, would approximate the figures of spirals. Such an arrangement is shown in FIGURE 2 and constitutes a preferred embodiment of this invention. Associated with inlets 6 and passageways 8 are a plurality of directing fins or louvers 9 constructed of a high temperature refractory material. These louvers may vary in number, a preferred embodiment constituting two louvers for every tangential inlet, equally spaced around the circumference of the reaction zone entrance, as shown. Either the feedstock conduit 7 or the combustion zone face adjacent the reaction chamber entrance may be readily employed to carry the louvers. As shown, louvers 9 are of considerably less width than length, the length of each louver more or less following a curvature approximating that of the outer walls of passageways 8.

In conducting the process of this invention, a combustible mixture is injected as such or as its component parts into combustion zone 5 through tangential inlets 6. This mixture is ignited and burned, and caused to flow through passageways 8 at an ever increasing velocity due to the decreasing radial cross sectional areas thereof. After combustion is substantially complete, the resultant combustion mass is caused to flow, by means of louvers 9, along an axis substantially parallel to the axis about which the mass is rotating into reaction zone 1. As the combustion mass flows into reaction zone 1, it moves longitudinally in a spiralling manner at a high peripheral velocity through the reaction zone. Once the spiral or helical flow of the combustion mass is established within the reaction zone, hydrocarbon feedstock is introduced into the zone through conduit 7. The particular means for effecting this introduction may be varied, but in any case it should be capable of placing a vaporized or atomized spray of feedstock into the vortex formed by the high velocity spiralling mass at a point within the reaction zone near the entrance thereof. The intimate mixing of feedstock and combustion mass resulting as the feedstock is swept into the mass causes a substantially instantaneous temperature increase of the feedstock to its cracking temperature with resultant formation of carbon black and by-products. The entire mass continues to follow the spiralling path of the combustion mass through the reaction zone and into the quench zone, not shown, where the reaction is terminated by cooling with water or other suitable cooling medium. The cooled reaction mass with entrained carbon black then exits from the reactor for subsequent separation and collection of carbon black.

The advantages of the process of this invention are believed apparent. An essential feature of the present process involves the acceleration of the tangentially injected combustible mixture once it has been introduced into the combustion zone. This is in contrast to previous processes employing tangential injection wherein rotational velocity is lost in the combustion zone because of friction, so that optimum velocity is not necessarily attained in the reaction zone. In the present invention, however, the loss of momentum due to wall friction is minimized so that optimum velocity is imparted to the combustion mass at the instant it engages the hydrocarbon feedstock. The increased turbulence thus obtained as the combustion mass flows into the reaction zone results in improved and more effective mixing.

The positive directing of the flow of combustion mass from the combustion zone into the reaction zone obtained as by the louvers 9 also constitutes an important feature of this invention. In the process as heretofore practiced, the flow of combustion mass naturally follows the path of least resistance with the result that the angle or corner created by the junction of the combustion zone and reaction zone walls erodes and becomes rounded. As this rounding becomes more pronounced, it appears to be accompanied by a decrease in product quality probably because of less intimate mixing of combustion mass and feedstock as the vortex diameter within the reaction zone increases. According to the present invention, the flow of the rotating combustion mass within the combustion zone, rather than following the path of least resistance into the reaction zone, is caused to follow a predetermined positively directed path that constitutes, in effect, a right angle change of course. In this way, a vortex of substantially constant diameter is maintained.

According to the present invention, possible oxidation of the hydrocarbon feedstock in the combustion zone is minimized by eliminating bridging of the combustion zone thereby. Coke formation on the corner created by the reaction and combustion zone walls is also minimized by elimination of bridging. Accordingly, quality is more readily maintained since the flow pattern and associated mixing action are not subject to wide variations.

In the description of the process to this point, the hydrocarbon feedstock has not been specified since the process is not restricted thereby nor is there any desire to so restrict it. Generally, any gaseous or liquid hydrocarbon may be employed in the process. As used throughout the specification and claims, therefore, the term hydrocarbon feedstock is intended to mean, generally, any hydrocarbon. Thus, natural gas as well as heavier hydrocarbon oils from both petroleum and non-petroleum sources may be employed in the process of this invention. Such oils may contain aliphatic hydrocarbon compounds whether acyclic or cyclic, saturated or unsaturated or an aromatic hydrocarbon. The hydrocarbon fuel likewise may be varied and may be the same as or different from the hydrocarbon feedstock. Generally, however, the hydrocarbon fuel will be natural gas if readily available. The combustion-supporting oxygen-bearing gas employed as process air and/or axial air may be air, oxygen-enriched air, oxygen or the like, but, for practical reasons, will usually be air. The amount of combustion supporting oxygen-bearing gas employed will vary depending upon the hydrocarbon fuel as well as the grade of carbon black being produced. The amount of oxygen employed in any particular case may be readily determined by one skilled in the art. Usually, the amount of oxygen employed will range from about that stoichiometrically required to obtain substantially complete combustion of the hydrocarbon fuel to as much as 125–150% of the stoichiometric amount. The predetermined amount of oxygen-bearing gas to be employed will, for the most part, usually be introduced to the reactor as process air with usually not more than about 8% being introduced with the hydrocarbon feedstock as axial air. Alternatively, all the necessary combustion-supporting oxygen-bearing gas may be supplied as process air and, if desired, in the absence of hydrocarbon fuel.

The following example further describes the invention. This example is illustrative only and not by way of limitation. The example is conducted in a reactor comprising a 12 inch diameter reaction zone having a length of 11 feet, and a combustion zone having a diameter of 33 inches at its greatest point and a length of 12 inches. It should be understood, however, that the dimensions may be modified and that those specified are illustrative only.

EXAMPLE

The feedstock employed has the following analysis:

| | |
|---|---:|
| Gravity, API, @ 60° F | 1.4 |
| Pour point °F | 37 |
| Flash point °F | 262 |
| Viscosity, SSU, @ 210° F | 71.1 |
| Carbon residue, Conradson, percent | 13.6 |
| Ash, percent | 0.029 |
| Sulfur, percent | 1.05 |
| Asphaltenes, percent | 5.6 |
| Aromatics, precent | 79.1 |
| Carbon, percent by wt | 90.49 |
| Hydrogen, percent by wt | 1.05 |
| Distillation, °F., at 760 mm.: | |
| IBP | 396 |
| 5% | 610 |
| 10% | 695 |
| 20% | 729 |
| 30% | 763 |
| 40% | 792 |
| 50% | 833 |
| 60% | 868 |
| 70% | 922 |
| 80% | 985 |

Operating conditions and results appear in the following table.

Table 1

| Run No. | Feedstock rate (gal./min.) | Fuel Gas rate (s.c.f.m.) | Air Rate (s.c.f.m.) | Yield (lbs./gal.) |
|---|---|---|---|---|
| 1 | 3.25 | 143 | 2,150 | 4.5 |
| 2 | 3.40 | 233 | 2,670 | 4.1 |

I claim:

1. A reactor for producing carbon black by thermal decomposition of a hydrocarbon feedstock which comprises: a tubular combustion chamber having a diameter greater than its length communicating axially through one of its ends with a tubular reaction chamber of smaller diameter and greater length than said combustion chamber; a hydrocarbon feedstock conduit extending through the other end of said combustion chamber and completely across the width thereof for introducing hydrocarbon feedstock axially into said reaction chamber, said conduit forming an annulus with the circumferential wall of said combustion chamber; at least one injection means tangentially disposed with respect to the circumferential wall of said combustion chamber and communicating therewith for tangentially injecting a stream of a combustible mixture into said annulus, thereby giving said stream of combustible mixture including the combustion mass resulting from the combustion thereof a rotational flow; said combustion chamber and conduit providing said annulus with a progressively decreasing cross-sectional area from the point at which said injection means is tangentially disposed with respect to said circumferential wall in the direction of flow of said tangentially injected stream whereby the rotational velocity of said stream is accelerated; and means for directing said rotationally flowing stream into said reaction chamber.

2. A reactor according to claim 1 in which the radial distance between the conduit and the circumferential wall progressively decreases from the point at which said injection means is tangentially disposed to said circumferential wall and in the direction of flow of said tangentially injected stream.

3. A reactor according to claim 1 in which said means for directing said rotationally flowing stream into said reaction chamber comprises a plurality of louvers situated at the end of said reaction chamber communicating with said combustion chamber, said louvers being curved in the direction of rotational flow of said stream.

4. A reactor according to claim 2 in which there are two tangentially disposed injection means.

References Cited in the file of this patent

UNITED STATES PATENTS

| | | |
|---|---|---|
| 2,413,586 | Skoog | Dec. 31, 1946 |
| 2,782,101 | Heller | Feb. 19, 1957 |
| 2,785,054 | Bethea et al. | Mar. 12, 1957 |
| 2,801,157 | Campbell et al. | July 20, 1957 |

FOREIGN PATENTS

| | | |
|---|---|---|
| 569,418 | Canada | Jan. 20, 1959 |

UNITED STATES PATENT OFFICE
CERTIFICATE OF CORRECTION

Patent No. 3,051,556               August 28, 1962

Travis S. Whitsel, Jr.

It is hereby certified that error appears in the above numbered patent requiring correction and that the said Letters Patent should read as corrected below.

Column 6, lines 20 and 29, before "from", each occurrence, insert -- extending --.

Signed and sealed this 8th day of January 1963.

(SEAL)
Attest:

ERNEST W. SWIDER
Attesting Officer

DAVID L. LADD
Commissioner of Patents